(12) United States Patent
Kirstein

(10) Patent No.: US 8,066,220 B2
(45) Date of Patent: Nov. 29, 2011

(54) AIRCRAFT ENGINE BALANCED THRUST VECTORING SYSTEM

(76) Inventor: Joshua M. Kirstein, Bellevue, WA (US)

(*) Notice: Subject to any disclaimer, the term of this patent is extended or adjusted under 35 U.S.C. 154(b) by 662 days.

(21) Appl. No.: 12/150,083

(22) Filed: Apr. 23, 2008

(65) Prior Publication Data

US 2009/0001216 A1    Jan. 1, 2009

Related U.S. Application Data

(60) Provisional application No. 60/925,970, filed on Apr. 23, 2007.

(51) Int. Cl.
*B64C 15/02* (2006.01)
(52) U.S. Cl. .................................... 244/23 A
(58) Field of Classification Search ............ 244/12, 244/23, 51, 52; 239/265.19, 265.25, 265.27; 60/229, 230
See application file for complete search history.

(56) References Cited

U.S. PATENT DOCUMENTS

| | | | | |
|---|---|---|---|---|
| 1,772,196 A | * | 8/1930 | Wallace | 244/12.5 |
| 2,945,641 A | * | 7/1960 | Pribram | 244/12.3 |
| 2,961,198 A | * | 11/1960 | Stevens | 244/12.5 |
| 3,065,936 A | * | 11/1962 | Messerschmitt | 244/23 R |
| 3,080,137 A | | 3/1963 | Hurel et al. | |
| 3,146,590 A | * | 9/1964 | Erwin | 244/12.3 |
| 3,190,584 A | * | 6/1965 | Gire et al. | 244/52 |
| 3,243,125 A | * | 3/1966 | Latulippe | 239/265.25 |
| 3,286,930 A | * | 11/1966 | Petrie | 239/265.27 |
| 3,289,946 A | | 12/1966 | Lennard | |
| 3,545,210 A | | 12/1970 | Cresswell | |
| 3,703,266 A | | 11/1972 | Lincks et al. | 244/52 |
| 3,830,451 A | * | 8/1974 | Fosness | 244/52 |
| 3,912,201 A | | 10/1975 | Bradbury | 244/23 D |
| 3,972,490 A | * | 8/1976 | Zimmermann et al. | 244/12.3 |
| 4,022,405 A | * | 5/1977 | Peterson | 244/12.3 |
| 4,140,290 A | | 2/1979 | Meier et al. | 244/52 |
| 4,171,112 A | | 10/1979 | Harvey | 244/12.5 |
| 4,691,879 A | | 9/1987 | Greene | 244/45 |
| 4,901,948 A | * | 2/1990 | Panos | 244/52 |
| 5,666,803 A | * | 9/1997 | Windisch | 239/265.25 |
| 6,371,407 B1 | | 4/2002 | Renshaw | 244/12.5 |
| 6,824,095 B2 | | 11/2004 | Mao | 244/12.5 |

* cited by examiner

*Primary Examiner* — Galen Barefoot
(74) *Attorney, Agent, or Firm* — Dean A. Craine

(57) ABSTRACT

A balanced thrust vectoring system for an aircraft designed to provide even weight distribution, simple thrust vectoring, and hover stability. The system includes a main diverter that connects to a jet output port. Located inside the diverter is a 4 way splitter that divides the diverter into four equal volumes. Attached to the diverter and adjacent to the two upper volumes are two front upward extending ducts. Attached to the diverter and adjacent to the two lower volumes are two rear upward extending ducts. Each duct includes an upper bend that and diagonally aligned nozzle opening. Each duct has only two bends which help vector the exhaust downward in an efficient manner. The diameter of each duct is consistent to allow their entire length to maximize air flow.

2 Claims, 5 Drawing Sheets

AIRCRAFT ENGINE BALANCED THRUST VECTORING SYSTEM

This is a utility patent application which claims benefit of U.S. Provisional Application No. 60/925,970 filed on Apr. 23, 2007.

BACKGROUND OF THE INVENTION

1. Field of the Invention

This invention relates to aircraft thrust diffusers, and more particularly to thrust diffusers that evenly distribute the flow of expelled air on opposite sides of the outlet's axis.

2. Description of the Related Art

Thrust vectoring is used in VTOL and STOL aircraft to redirect thrust from a main engine that is parallel to the aircraft's longitudinal axis to a downward direction to vertically lift the aircraft. In order to lift the aircraft vertically, the direction of thrust must be maintained through the aircraft's center of gravity. This is normally performed by using gimballed exhaust nozzles that rotate from a horizontal position to produce forward thrust and a vertical position to produce vertical lift. The gimballed exhaust nozzles must also swivel from side-to-side so that the direction of thrust is always directed through an axis that extends through the aircraft's center of gravity.

One drawback, which is addressed with the thrust vectoring system disclosed herein is that the gimballed exhaust nozzle systems currently used are relatively complex and do not adequately stabilize the aircraft when vertically lifting the aircraft or when performing hovering maneuvers.

SUMMARY OF THE INVENTION

A thrust vectoring system for an aircraft is disclosed herein, designed to provide even weight distribution, simple thrust vectoring, and hover stability. The system includes a thrust diverter that is longitudinally aligned with an output exhaust port on a jet engine. Located inside the thrust diverter is a splitter which evenly divides the exhaust from the jet engine into four separate, duct assemblies. The four duct assemblies are divided into two duct pairs: a front duct pair and a rear duct pair, the two ducts in each duct pair are transversely aligned and equally spaced apart from the diverter's transverse axis. Each duct extends upward in an equal distance above the thrust diverter's longitudinal axis and includes an upper curved nozzle that bends laterally and diagonally downward thereby delivering exhaust on opposite sides of the diverter's longitudinal and transverse axis. The size and shape of each duct in the duct pair are complimented with a mirror image of each other so that the amount of exhaust from each duct is equal. Each duct has only two bends which maximizes the exhaust's flow efficiency therein. The shape and diameter of each duct uniform their entire length which also maximizes exhaust flow.

DESCRIPTION OF THE PREFERRED EMBODIMENT(S)

Figure 1:
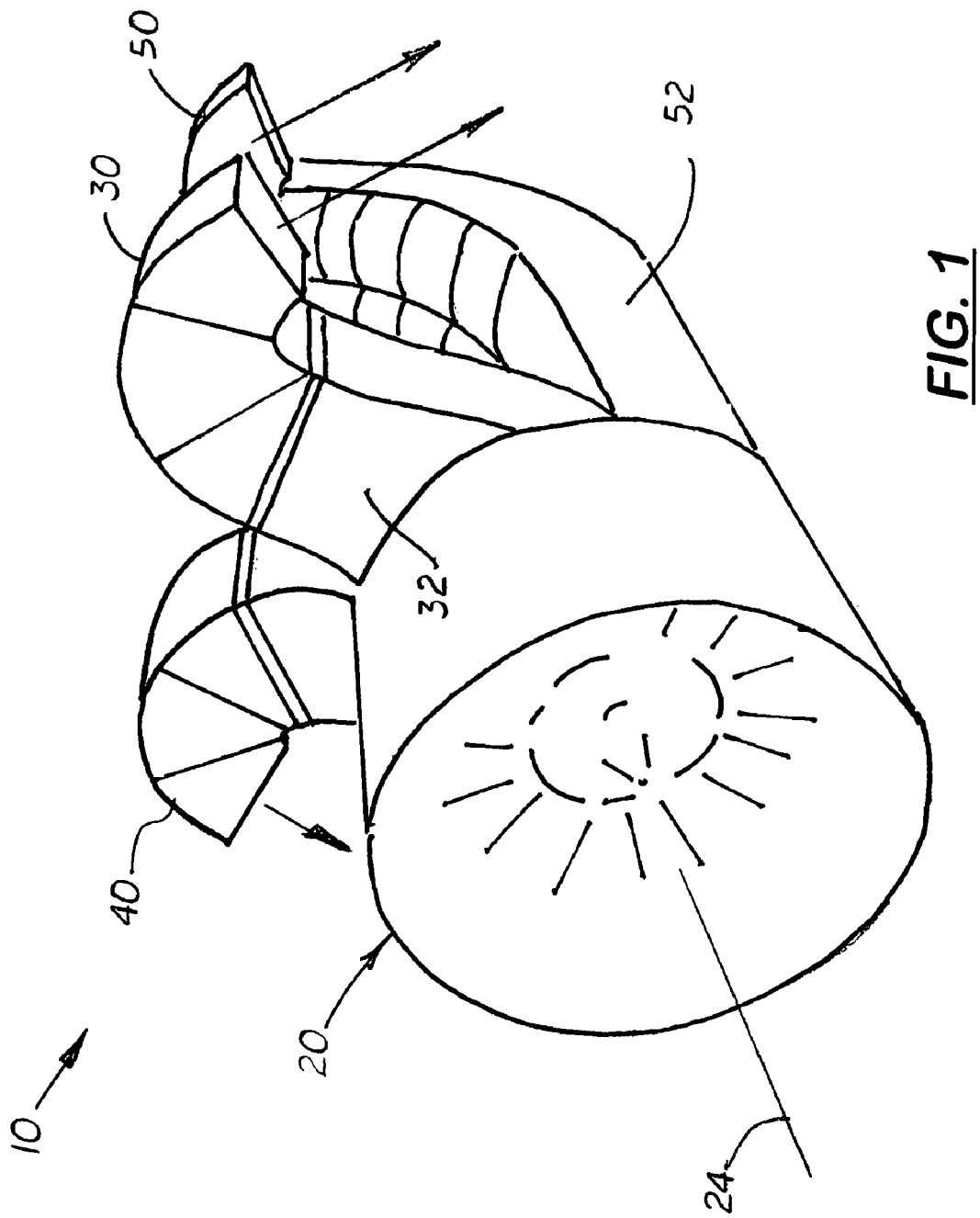
FIG. 1 is a perspective view of an aircraft balanced thrust vectoring system disclosed herein.
Figure 2:
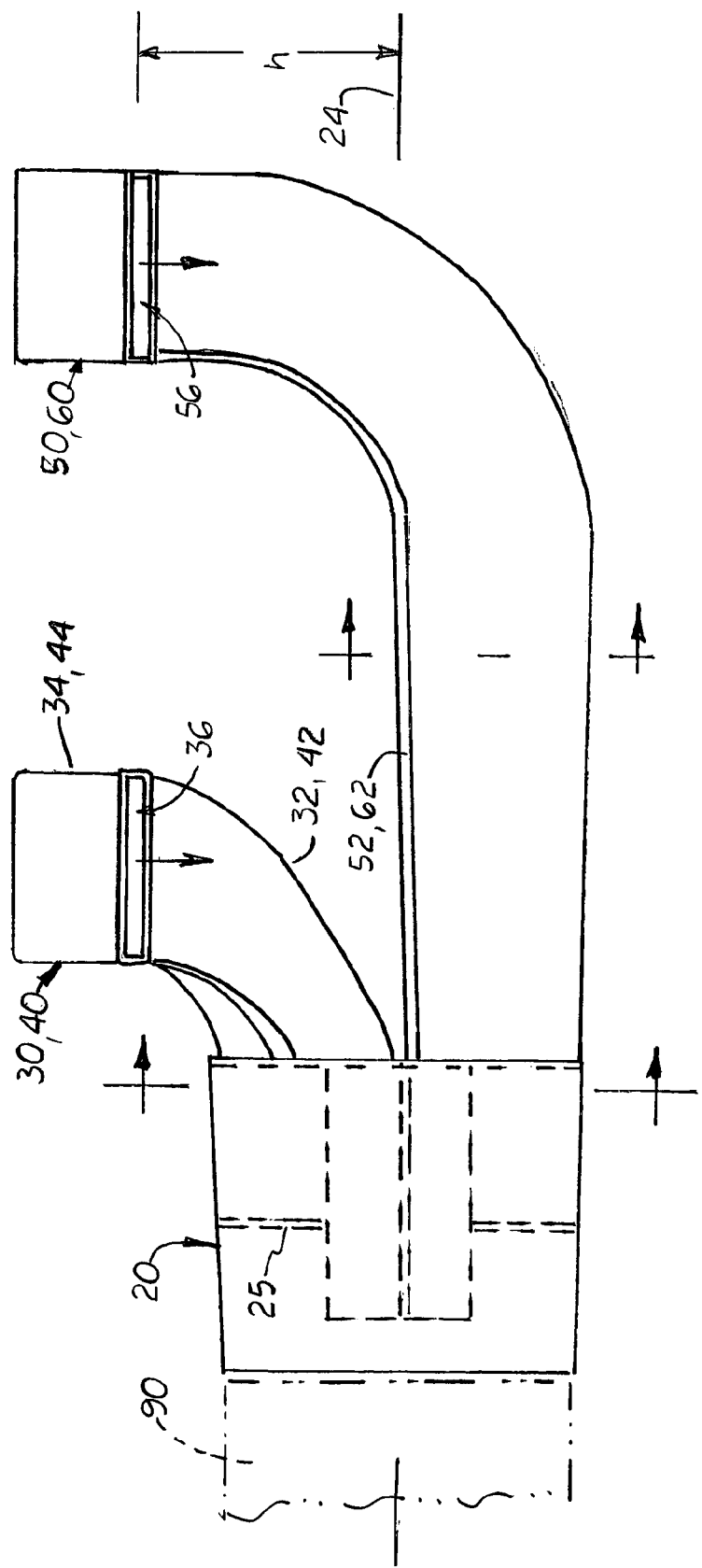
FIG. 2 is a side elevational view of the aircraft balanced thrust vectoring system.
Figure 3:
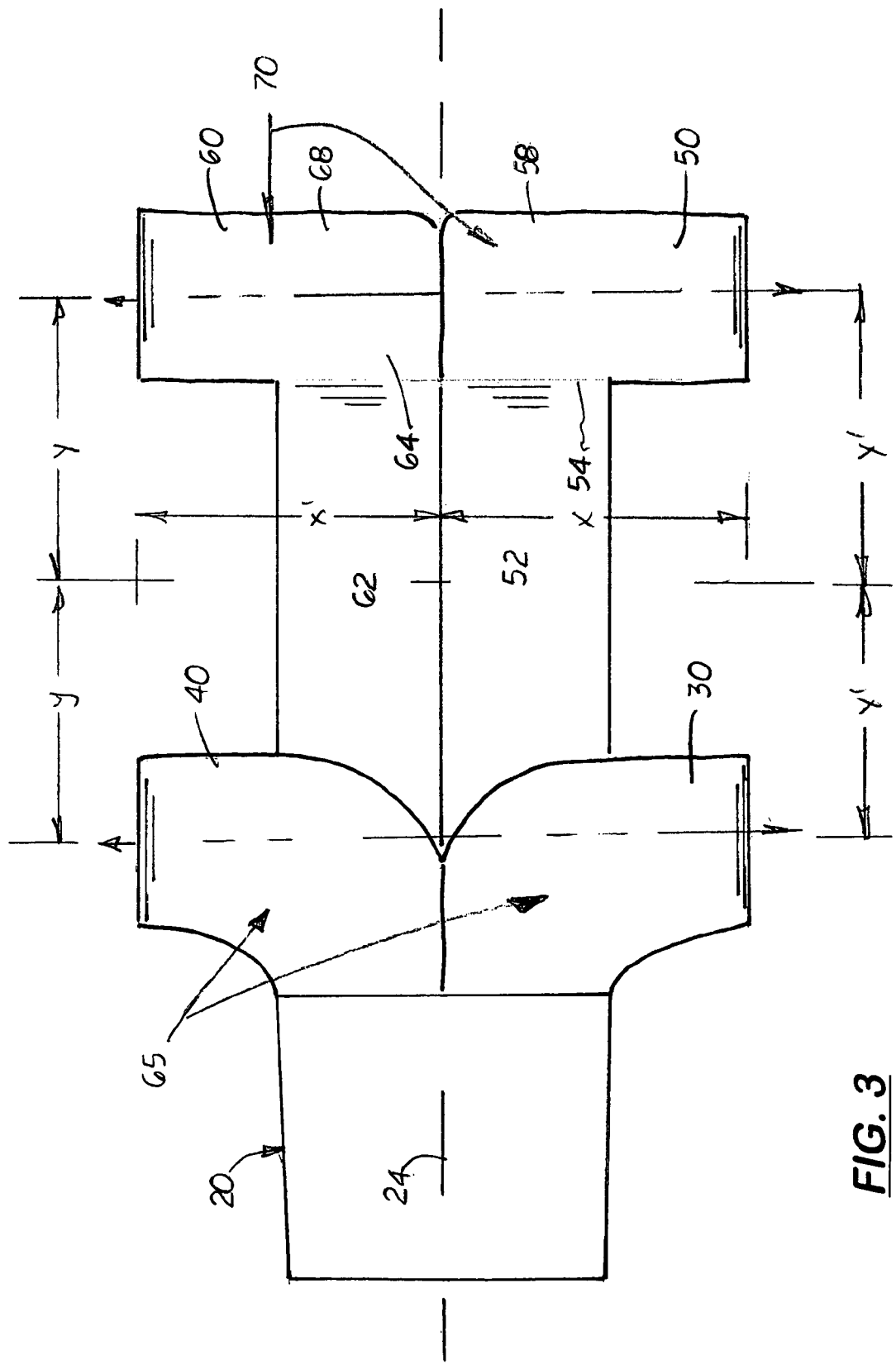
FIG. 3 is a top plan view of the aircraft balanced thrust vectoring system shown in FIG. 2.
Figure 5:
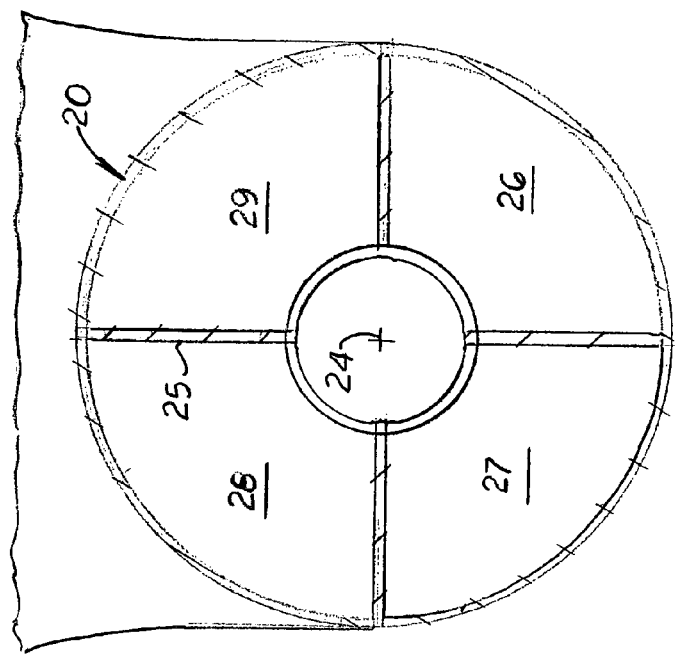
FIG. 5 is a sectional end elevational view of the aircraft balanced thrust vectoring system as shown along line 5-5 in FIG. 2.

Referring to the FIGS. 1-6 there is shown a balanced thrust vectoring system 10 for an aircraft designed to provide even weight distribution, simple thrust vectoring, and hover stability. The system 10 includes a cylindrical thrust diverter 20 that is longitudinally aligned with an output exhaust port on a jet engine 90 (see FIG. 2). Located inside the thrust diverter 20 is a four way splitter 25 which evenly divides the flow of exhaust from the jet engine 90 into four separate volumes 26-29 (see FIG. 5). Attached and extending rearward from the diverter 20 and longitudinally aligned with each duct volume 26-29 is a fixed duct 30, 40, 50, and 60, respectively, which evenly distributes the exhaust from the diverter 20 to provide balanced vertical lift on the aircraft.

In the preferred embodiment, the four ducts 30, 40, 50, 60 are divided into two pairs: a front duct pair 65 and a rear duct pair 70. The two ducts 30, 40 and 50, 60 in each duct pair 65, 70, respectively, are transversely aligned and equally spaced apart on opposite sides of the diverter's longitudinal axis 24.

Figure 4:
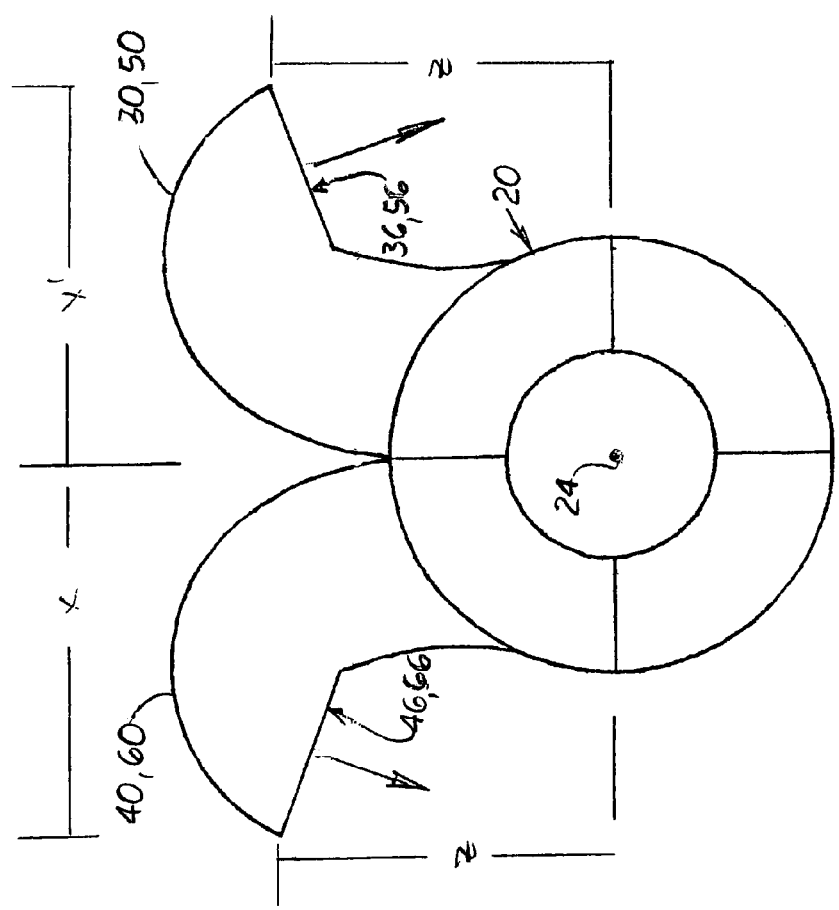
FIG. 4 is an end elevational view of the aircraft balance thrust vectoring system.
Figure 6:
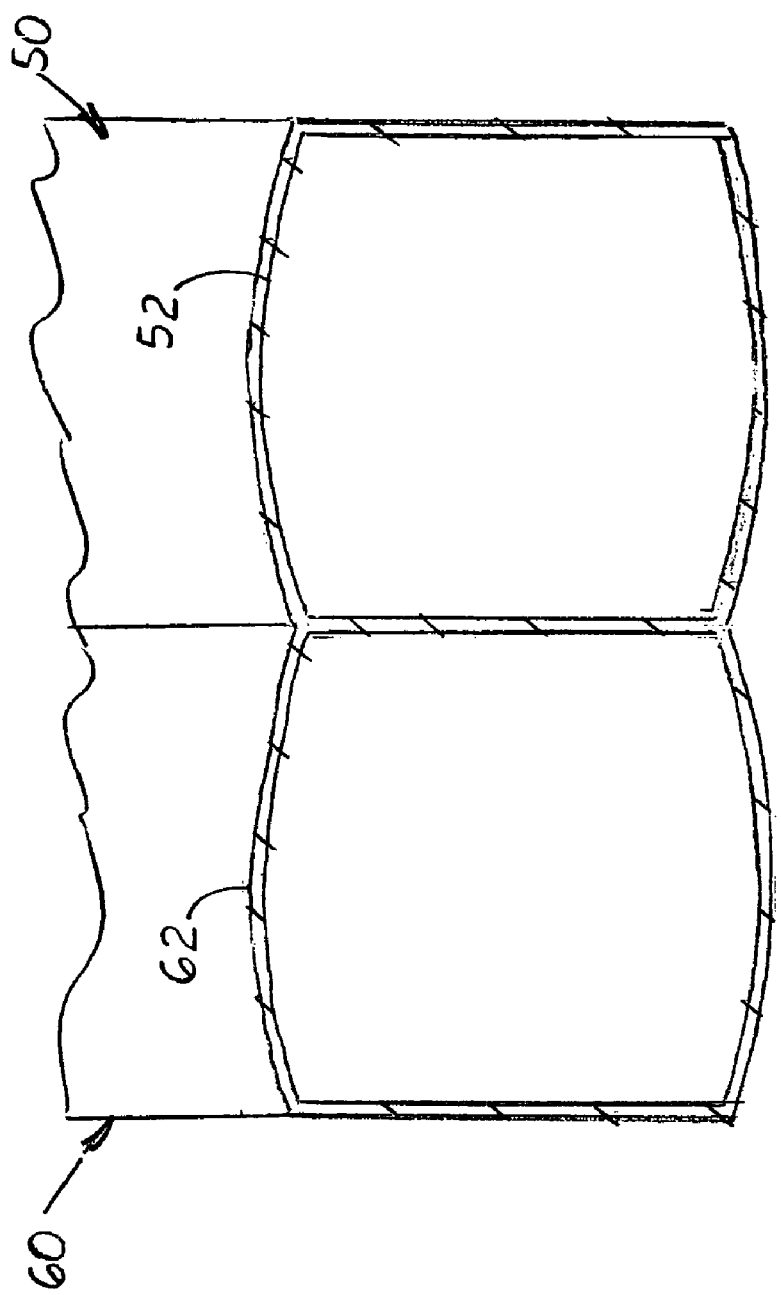
FIG. 6 is a sectional end elevational view of the aircraft balanced thrust vectoring system as shown along line 6-6 in FIG. 2.

Each duct 30, 40, 50, or 60 extends upward an equal distance above the thrust diverter's longitudinal axis 24, (see dimension 'z' in FIG. 4). Each front duct 30, 40, includes a lower bend 32, 42, respectively, and an upper bend 34, 44, respectively. The two front ducts 30, 40 are symmetrically aligned on opposite sides of the diverter's longitudinal axis 24 (see dimension y, y', and x, x' in FIG. 3). The lower bends 32, 42 extend upward approximately 90 degrees while the upper bends 34, 44 extends laterally approximately 120 degrees from the duct's vertical longitudinally axis 24. The lengths of the two front ducts 30, 40 are equal. Formed on each front duct 30, 40 and each rear duct 50, 60 is a diagonally aligned rectangular shaped nozzle opening 36, 46, and 50,60, respectively. As shown in FIG. 4, the front and rear nozzle openings 36, 46 and 56, 66, respectively, are located at the same approximate distance above and lateral to the longitudinal axis 24.

The two rear ducts 50, 60 are also symmetrical on opposite sides of the diverter's longitudinal axis 24. Each rear duct 50, 60 includes a straight lower section 52, 62, a lower curved section 54, 64 and a curved upper bend 58, 68, respectively. The lengths of the two rear ducts 50, 60 are equal. Formed on each duct 50, 60 is a diagonally aligned, rectangular shaped nozzle opening 56, 66, respectively. The rear nozzle openings 56, 66 are located at the same approximately elevation from each other and the same elevation as the front nozzle openings above the longitudinal axis 24.

The cross-sectional areas of the four ducts 30, 40, 50, 60 are identical and substantially uniform their entire length. The sizes, shapes and orientations of the four nozzle openings are substantially identical. The nozzle openings are also substantially balanced on opposite sides of the longitudinal and traverse axis. Because each duct 30, 40, 50, and 60 has only two bends, the flow of exhaust is maximized and balanced on all four sides.

Using the above described system, a method for providing a balanced vertical lifting force on an object is provided comprising the following steps:

a. selecting an aircraft;

b. attaching a diverter to said aircraft behind a jet engine, said diverter including a splitter that divides a column of exhaust delivered to said diverter into four equal volumes;

c. attaching a pair of front ducts and a pair of rear ducts to said diverter, each said duct being aligned with the splitter so that one volume of exhaust flows therein, said pair of front ducts and said pair of rear ducts being equally spaced apart on opposite sides of said longitudinal axis of said diverter, said ducts also being equal in size and shape and extending upward from said longitudinal axis and including a lateral facing nozzle opening which creates a balanced exhaust flow on opposite sides of said aircraft; and, d. activating said jet engine on said aircraft to vertically lift said aircraft.

In compliance with the statute, the invention described herein has been described in language more or less specific as to structural features. It should be understood however, that the invention is not limited to the specific features shown, since the means and construction shown, is comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. A lift vehicle with a thrust vectoring system to generate even weight distribution, simple thrust vectoring, and hover stability, said lift vehicle, comprising:

a. a lift vehicle with an air flow thrust generator mounted therein, said lift vehicle having a vertical and horizontal center gravity axis, said air flow thrust generator has an output exhaust port;

b. a hollow, thrust diverter having a longitudinal axis that is longitudinally aligned with said output exhaust port on said air flow thrust generator;

c. a stationary four way splitter located inside said diverter that divides exhaust from said air flow thrust generator air and delivered to said thrust diverter into four equal volumes; and, d. a balanced air exhaust duct apparatus attached to said diverter, said apparatus includes a vertical center axis aligned and registered with said longitudinal axis on said diverter, said apparatus includes four duct assemblies comprising two fixed, upward extending front air exhaust ducts and two fixed, upward extending rear air exhaust ducts, said front air exhaust ducts extending upward on opposite sides of said longitudinal axis of said diverter and said rear air exhaust ducts extending upward and parallel on opposite sides of said longitudinal axis of said diverter, said front air exhaust ducts and said rear air exhaust ducts being evenly space on opposite sides of said vertical center axis of said apparatus, each said front air duct and each said rear air duct includes a lower 90 degree arc, an upper arc that bends laterally and diagonally approximately 120 degrees and terminate to form a nozzle opening, said nozzle openings of said front air ducts and said rear air ducts being positioned at the same distance above and lateral to said longitudinal axis of said diverter.

2. A method for providing a balanced vertical lifting force on an object is provided comprising:

a. selecting an aircraft with a jet engine attached thereto;

b. attaching a hollow diverter to said aircraft behind said jet engine, said diverter includes a fixed splitter located therein that divides a column of exhaust from said jet engine and delivered to said diverter into four equal volumes, said diverter includes a longitudinal axis;

c. attaching four duct assemblies that include a pair of front ducts and a pair of rear ducts to said diverter, each said duct being aligned with the splitter so that one volume of exhaust flows therein, said pair of front ducts and said pair of rear ducts includes a nozzle opening and is equally spaced apart on opposite sides of said longitudinal axis of said diverter, said ducts include a lower arc that bends upward, and an upper arc that bends laterally and diagonally outward so that said nozzle openings are are equal distanced form said equal distance above said longitudinal axis of said diverter thereby creating a balanced exhaust flow from said jet engine on opposite sides of said aircraft; and, d. activating said jet engine on said aircraft to vertically lift said aircraft.

* * * * *